United States Patent
Baynaud et al.

(10) Patent No.: US 8,468,574 B2
(45) Date of Patent: Jun. 18, 2013

(54) AUDIOVISUAL PROGRAM CONTENT PREPARATION METHOD, AND ASSOCIATED SYSTEM

(75) Inventors: Erwan Baynaud, Nozay (FR); Gérard Delegue, Nozay (FR); Olivier Martinot, Nozay (FR)

(73) Assignee: Alcatel Lucent, Paris (FR)

( * ) Notice: Subject to any disclaimer, the term of this patent is extended or adjusted under 35 U.S.C. 154(b) by 492 days.

(21) Appl. No.: 12/356,166

(22) Filed: Jan. 20, 2009

(65) Prior Publication Data

US 2009/0187263 A1    Jul. 23, 2009

(30) Foreign Application Priority Data

Jan. 21, 2008    (FR) ...................................... 0800282

(51) Int. Cl.
*H04N 7/173* (2011.01)
(52) U.S. Cl.
USPC ........... 725/115; 725/100; 725/131; 725/145; 715/723
(58) Field of Classification Search
USPC ...... 725/115, 145, 100, 131; 386/52; 715/723
See application file for complete search history.

(56) References Cited

U.S. PATENT DOCUMENTS

| | | | |
|---|---|---|---|
| 7,890,599 B2 * | 2/2011 | Kalmanje et al. | 709/217 |
| 2002/0070958 A1 * | 6/2002 | Yeo et al. | 345/723 |
| 2002/0194607 A1 | 12/2002 | Connelly | |
| 2003/0120495 A1 * | 6/2003 | Watanabe et al. | 704/278 |
| 2003/0187919 A1 * | 10/2003 | Nakamura et al. | 709/203 |
| 2005/0180580 A1 * | 8/2005 | Murabayashi et al. | 381/81 |
| 2006/0165379 A1 * | 7/2006 | Agnihotri et al. | 386/95 |
| 2007/0061853 A1 | 3/2007 | Kondo et al. | |
| 2007/0198532 A1 * | 8/2007 | Krikorian et al. | 707/10 |
| 2007/0226349 A1 | 9/2007 | Nakaguma | |
| 2009/0132924 A1 * | 5/2009 | Vasa et al. | 715/723 |

FOREIGN PATENT DOCUMENTS

| | | |
|---|---|---|
| JP | 2002-232823 A | 8/2002 |
| JP | 2004-007342 A | 1/2004 |
| JP | 2007-258856 A | 4/2007 |

OTHER PUBLICATIONS

French Search Report.

* cited by examiner

*Primary Examiner* — Pankaj Kumar
*Assistant Examiner* — Mulugeta Mengesha
(74) *Attorney, Agent, or Firm* — Fay Sharpe LLP

(57) ABSTRACT

The object of the invention is an audiovisual program content preparation method. The inventive method comprises the following steps:

- a user group (5) is selected,
- sequences are selected from a chosen audiovisual program content feed, by identifying them using markers,
- the sequences are extracted using the markets for the chosen audiovisual program content feed,
- the extracted sequences are saved in a database (9) accessible to the users of said group (5).

12 Claims, 4 Drawing Sheets

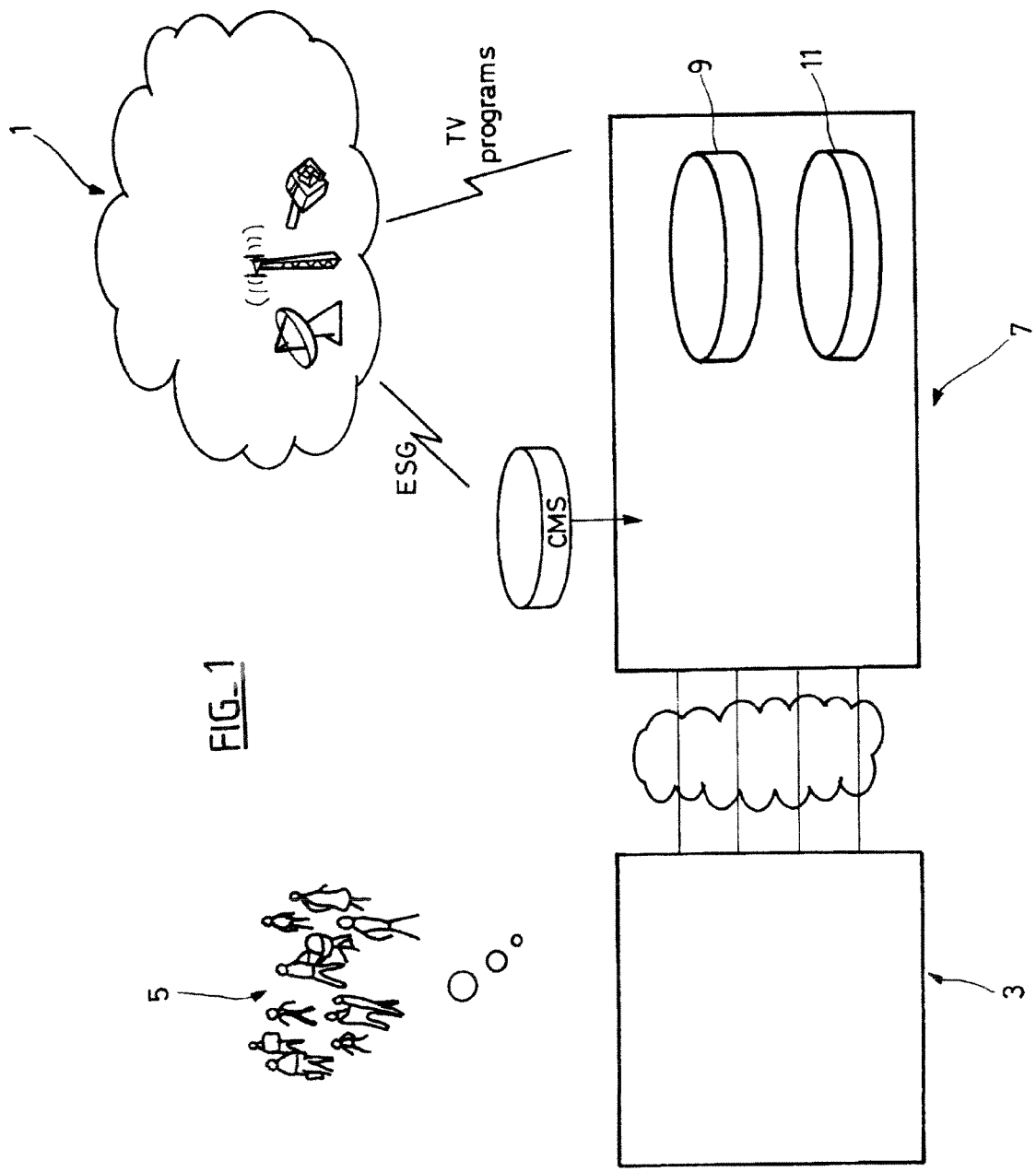
FIG_1

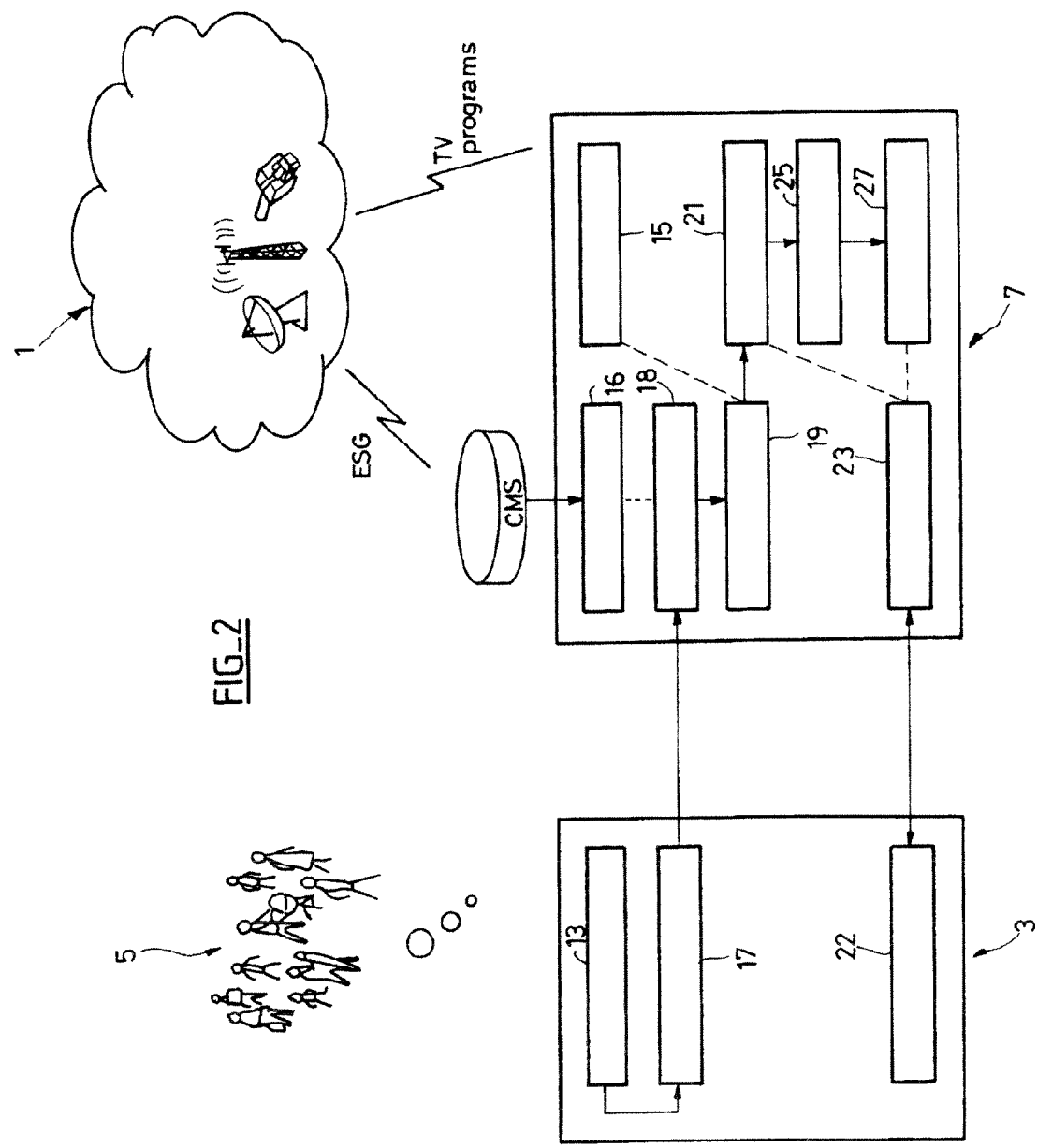

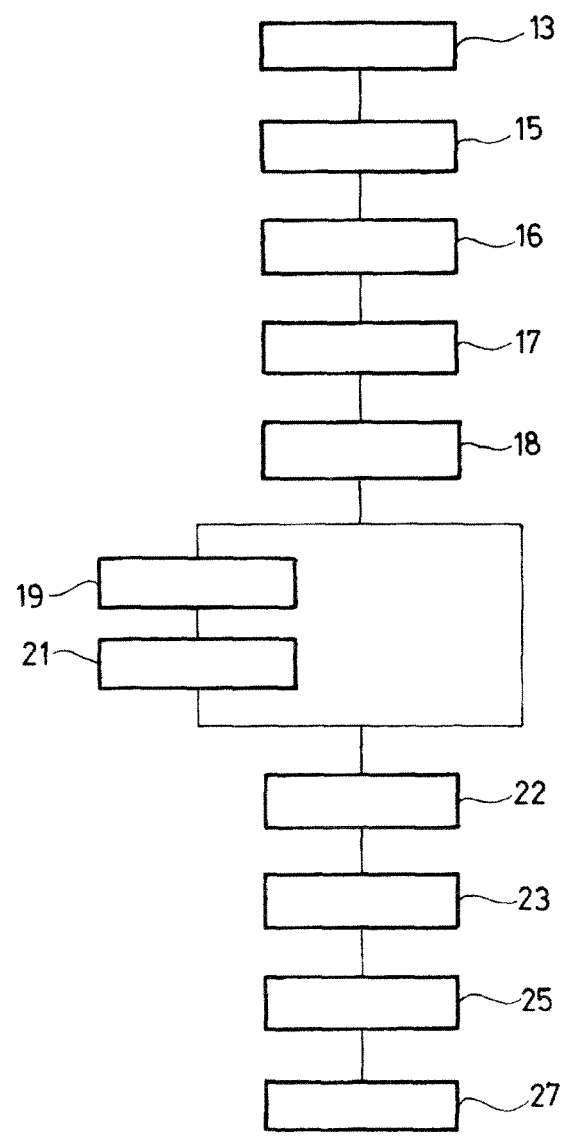

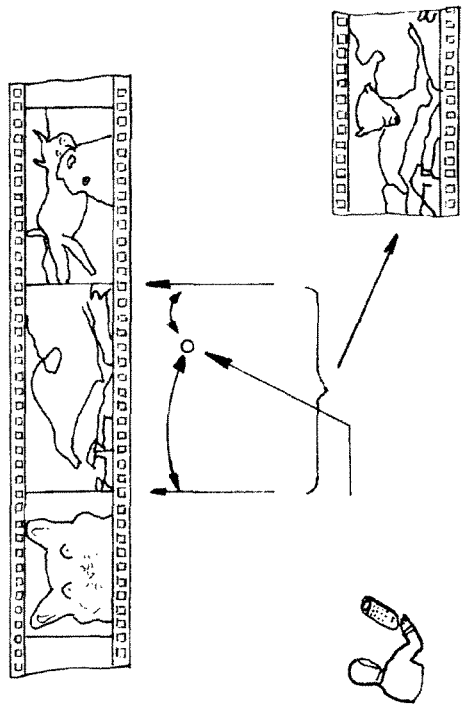
FIG_4
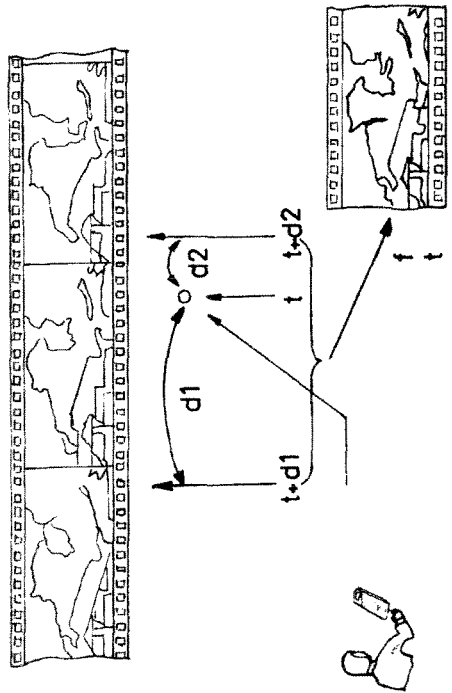
FIG_5

AUDIOVISUAL PROGRAM CONTENT PREPARATION METHOD, AND ASSOCIATED SYSTEM

This invention pertains to an audiovisual program content preparation method. It also pertains to an audiovisual program content preparation system, and a terminal and server for implementing such a method.

Currently, in the audiovisual field, users can choose from among several audiovisual program content feeds to watch on terminals like television sets, computers, or mobile telephones.

The growing number of channels and services offers users increasingly more choices.

In order to allow users to make their choices from among the channels or services offered to them, they may, for example, have access to an electronic service guide, or ESG.

However, among all of these possible choices, the user is unable to select a particular sequence within a given feed, and unable to share it with other users.

This invention is therefore intended to disclose a method enabling a user to share his or her preferences.

To that end, the object of the invention is an audiovisual program content preparation method, said method characterized in that it comprises the following steps:
a group of users is selected,
sequences are selected from a chosen audiovisual program content feed, by identifying them using markers,
the sequences are extracted using the markets for the chosen audiovisual program content feed,
the extracted sequences are saved in a database accessible to the users of said group, in such a way as to enable the users of said group to rate said saved sequences from said database.

In this manner, every user can simply and easily join a group, select audiovisual signals, with all channels taken together, and share them with the other users in the group in order to allow them to enjoy the best moments, such as the most horrifying or the most emotional ones, and thereby, in some cases, to discover some shows through sequences selected by the users.

In one preferred embodiment, the audiovisual program content preparation method comprises a step of comparing markers that identify selected sequences to be extracted to markers of extracted sequences saved in the database, in order to determine whether the selected sequences have already been extracted, and if so, to not extract them again.

Advantageously, a preference parameter is associated with at least one extracted sequence saved in the database.

Preferentially, the preference parameter is calculated based on individual preference parameters sent by the users of said group.

Advantageously, the audiovisual program content preparation method comprises a step in which the sequences with the highest preference parameter are selected in order to create a piece of content combining these sequences preferred by the users of said group.

Preferably, the content combining the sequences preferred by the users of said group are saved in a database that is accessible to the users of said group.

In one advantageous alternative, the audiovisual program content preparation method comprises a step in which identification and descriptive information is added to the audiovisual program content.

In one preferred embodiment, when at least one sequence is selected at moment t, that sequence is extracted beginning from a predefined moment prior to instant t, and ending at a predefined moment later than moment t.

In another preferred embodiment, the step of extracting sequences includes detecting cuts in sequences.

Another object of the invention is an audiovisual program content preparation system for implementing a method as previously described, characterized in that it comprises:
at least one terminal comprising:
means for selecting a group of users, and
means for selecting sequences from a chosen audiovisual program content feed by identifying them using markers,
and a server comprising:
means for extracting sequences using markers for the chosen feed of audiovisual program content, and
means for saving the extracted sequences in a database that is accessible to the users of said group.

Yet another object of the invention is a terminal for an audiovisual program content preparation system as previously mentioned, said terminal being characterized in that it comprises:
means for selecting a group of users, and
means for selecting sequences from a chosen audiovisual program content feed by identifying them with markers that are intended to be sent to a server of the audiovisual program content preparation system as previously described.

Finally, another object of the invention is a server for an audiovisual program content preparation system as previously mentioned, said terminal being characterized in that it comprises:
means for extracting sequences from the chosen audiovisual program content feed using markers that are sent by a terminal of the audiovisual program content preparation system as previously described, and
means for saving the extracted sequences in a database that is accessible to the users of a selected group from a terminal of the audiovisual program content preparation system as previously described.

Other characteristics and advantages of the invention will become apparent upon reading the following description, given as a non-limiting example, with reference to the attached drawings, in which:

FIG. 1 schematically depicts the general structure of an audiovisual program content preparation system according to the invention, FIG. 2 depicts the successive steps of an audiovisual program content preparation method according to the invention in relation with the structures of the preparation system shown in FIG. 1 performing those steps, FIG. 3 sequentially depicts the successive steps of the audiovisual program content preparation method according to the invention, FIG. 4 depicts the step of sequence extraction according to a first embodiment, FIG. 5 depicts the step of sequence extraction according to a second embodiment.

FIG. 1 depicts a television network 1 that sends out audiovisual programs and provides users with an electronic service guide (or ESG) enabling users to browse in order to see, for example, the various programs scheduled on the various channels based on their time, genre, etc., as well as a content management system, or CMS.

This television network 1 is connected to an audiovisual program content preparation system for implementing the inventive audiovisual program content preparation method.

This audiovisual program content preparation system comprises a terminal 3 for accessing the audiovisual program content sent out by the television network 1. This terminal may, for example, be a television set, a computer, a mobile telephone, or a personal digital assistant (PDA).

A user of the terminal 3 may belong to one or more user groups, such as "family" or "friends". These user groups are somewhat similar to Internet communities, for example. To do so, the terminal 3 includes means for selecting a user group 5.

One or more users of the group 5 are also administrators. This position is somewhat similar to that of moderators on Internet discussion forums, i.e. controlling and moderating any exchange within the group.

The audiovisual program content preparation system further comprises a server 7 connected both to the television network 1 and to the terminal 3.

In order to enable the user of the audiovisual program content preparation system to select a sequence that he or she deems interesting while viewing a given program, i.e. from within a chosen audiovisual program content feed, the terminal 3 comprises means for selecting sequences by identifying them using markets intended to be sent to the server 7.

The server 7 comprises means for saving the program viewed by the user, such as by using a circular memory. The content stays saved for a duration greater than or equal to a predetermined duration d1. The server 7 also comprises means for extracting identified sequences using markers sent by the terminal 3, in such a way as to be able to extract the identified sequences from the saved viewed program.

In one particular embodiment, the means for extraction from the server 7 comprise means for analyzing time in such a way as to make it possible to extract a selected sequence at a moment t, beginning at a moment t−d1, and continuing until a moment t+d2.

These moments t−d1 and t+d2 are determined by the fixed durations d1 and d2 that pass prior to and after the moment t.

In another particular embodiment, the means for extraction from the server 7 comprise means for detecting cuts in sequences. In this manner, when the user selects the sequence at a moment t, the means for detecting cuts in sequences are capable of detecting, in the saved viewed program, the beginning and end of the sequence, which makes it possible to extract the selected sequence.

However, after being extracted by one embodiment or another, the sequence may be adjusted either in the server or by the user.

The server 7 further comprises means for saving extracted sequences in a database 9 that is accessible to the users of the group 5, thereby enabling the users of the group 5 to share and view the saved sequences.

However, to keep the same sequence from being extracted multiple times, the server 7 comprises means for comparing the markers that identify the sequences selected by the user for extraction, using the markers of the extracted sequences saved in the database 9.

Once the sequences selected by the users have been saved in the database 9, it is possible for the users to rate these saved sequences, both individually and as a group.

To do so, the terminal 3 comprises means for assigning individual preference parameters to the sequences saved in the database 9, enabling every user of the group 5 to individually rate the sequences that he or she has viewed.

The server 7 also comprises means for assigning preference parameters that make it possible to give a rating that represents the entire group 5 for the sequences saved in the database 9.

In one embodiment, these assignment means comprise calculation means for averaging the various individual parameters sent out by the users of the group 5.

Advantageously, the server 7 comprises:
means for comparing preference parameters assigned to sequences saved in the database 9,
means for selecting the sequences with the highest preference parameter, and
means for creating a piece of content combining these sequences preferred by the users of the group 5.

The content created in this manner is representative of the group 5.

The server 7 also comprises means for saving the content combining the sequences preferred by the users of the group 5 in a database 11 that is accessible to the users of the group 5.

When this content combining the sequences preferred by the users is saved in the database 11, the users may rate this content in a manner similar to how they rate the sequences saved in the database 9.

To do so, the terminal 3 comprises means for assigning individual preference parameters to the content saved in the database 11.

Likewise, the server 7 comprises means for assigning preference parameters that make it possible to give a rating that represents the entire group 5 for the content saved in the database 11.

Preferentially, the server 7 further comprises means for analyzing the preference parameters assigned to the sequences saved in the database 9 and to the content saved in the database 11, in order to rank the best sequences and content as rated by the group 6 and by all of the user groups, and thereby to give precedence to the users and groups that selected the best sequences. Each user can know which sequences, content, users, and groups have won awards.

Preferably, the server 7 comprises means for adding information used to identify and describe the audiovisual program content. This information may, for example, include metadata.

More precisely, the content comprises tags such as the beginning or end of a file, or identification for it. These tags improve the ability to search for information, such as for the purpose of extracting a sequence, and are stored beforehand in the content management system (CMS) provided by the electronic service guide (ESG).

When extracting the sequences, the metadata of the audiovisual program content is associated with the extracted sequences.

What's more, the sequences comprise information related to the channel broadcasting the audiovisual program from which they have been extracted.

Finally, the server 7 advantageously comprises means for controlling the sequence and content in order to not be offensive and to comply with legal requirements. These control means are used by the administrators of the group 5, as well as by the service providers.

As depicted in FIGS. 2 and 3, the audiovisual program content preparation method comprises multiple steps, which are detailed below.

During a first step 13, the user selects one or more user groups 5 from the terminal 3.

When the user decides to view a television program, he or she is actually selecting an audiovisual program content feed, and the server 7 saves the viewed program, such as by using a circular memory, during step 15. The content stays saved for a duration greater than or equal to a predetermined duration d1.

If, while viewing this program, one or more sequences particularly interest the user, he or she then selects these sequences by identifying them using markers, which is step 17.

Upon the completion of step 17, the sequences are extracted using the markers during a step 19, and during a step 21, the extracted sequences are saved in the database 9 that is accessible to the users of the group 5.

The user may thereby directly select a sequence that he or she wants to extract while watching an audiovisual program, and once this sequence has been saved, it may then be shared simply and easily with all of the other users who belong to the group 5.

Advantageously, the audiovisual program content preparation method includes a step 18 of comparing markers that identify selected sequences to be extracted to markers of extracted sequences saved in the database 9, in order to determine whether the selected sequences have already been extracted, and if so, to not extract them again.

The database 9 does not become needlessly overloaded, which also makes managing that database simpler.

In the embodiment described, the audiovisual program content preparation method comprises a step 23 in which the server 7 associated a preference parameter to at least one extracted sequence saved in the database 9. The method thus allows for different extracted sequences saved in the database 9 to be rated.

Preferentially, the preference parameter is calculated based on individual preference parameters sent out by the users of the group 5 during a step 22. The preference parameter is therefore representative of all the users of the group 5.

Following step 23, the audiovisual program content preparation method advantageously comprises a step 25 wherein the server 7 selects sequences with the highest preference parameter, in order to create a piece of content combining these sequences preferred by the users of the group 5.

A "best-of", i.e. a collection of the best moments of audiovisual programs as rated by the users of the group 5, is created simply, and is personalized for the users of the group 5.

Such a piece of content may be about three minutes long, with sequences that each last about 15 seconds.

The content combining the sequences preferred by the users of the group 5 are then saved in the database 11 that is accessible to the users of the group 5, during a step 27.

Each user of the group 5 may thereby have unlimited access to this content, in a manner similar to how they access the sequences saved in the database 9.

Preferably, the audiovisual program content preparation method comprises a step 16 wherein identifying and descriptive information, or "metadata", is added to the audiovisual program content. This metadata is associated with the sequences during the step 19 of extracting sequences.

As shown in FIG. 4, the step 19 of extracting sequences is time-based, in one particular embodiment. When a sequence is selected by the user at the moment t, two fixed durations, d1 and d2, are respectively measured prior to and after the moment t for the sequence selected.

The sequence is then extracted beginning at a moment t−d1 prior to the moment t, and continuing until a moment t+d2 after the moment t. These two moments t−d1 and t−d2 are determined by the fixed durations d1 and d2. The normal sequence is then ready to be saved in the database 9.

In another embodiment shown in FIG. 5, the step 19 of extracting sequences is based on detecting cuts in sequences. Whenever a sequence is selected by the user at the moment t, in the saved viewed program, the server's 7 detection means detect the beginning and end of the selected sequence. Next, the sequence is extracted in full to be saved in the database 9.

In this manner, with such an audiovisual program content preparation method, individuals may be members of a user group, and share and rate the sequences that they have themselves selected directly while viewing an audiovisual program, and create "best-of" content based on their ratings, which are personalized for them and representative of them, and may once again rate this "best-of" content in order to give out awards. All of the steps of the audiovisual program content preparation method are automatic, and do not require any complicated applications.

The invention claimed is:

1. An audiovisual program content preparation method for an audiovisual program content preparation system having a memory storing the method, characterized in that it comprises the following steps:
   a user group is selected by a terminal of the system,
   sequences are selected by the terminal of the system from a chosen audiovisual program content feed, by identifying them using markers,
   the sequences are extracted by a server of the system using the markers for the chosen audiovisual program content feed,
   the extracted sequences are saved by the server in a database accessible to the users of said group, in such a way as to enable the users of said group to rate said saved sequences from said database.

2. An audiovisual program content preparation method according to claim 1, characterized in that it comprises a step of comparing markers that identify selected sequences to be extracted to markers of extracted sequences saved in the database, in order to determine whether the selected sequences have already been extracted, and if so, to not extract them again.

3. An audiovisual program content preparation method according to claim 1, characterized in that a preference parameter is associated with at least one extracted sequence saved in the database.

4. An audiovisual program content preparation method according to claim 3, characterized in that the preference parameter is calculated based on individual preference parameters sent out by the users of the group.

5. An audiovisual program content preparation method according to claim 4, characterized in that it comprises a step wherein the sequences with the highest preference parameter are selected, in order to create a piece of content combining these sequences preferred by the users of the group.

6. An audiovisual program content preparation method according to claim 5, characterized in that the sequences preferred by the users of the group are then saved in the database that is accessible to the users of the group.

7. An audiovisual program content preparation method according to claim 5, characterized in that it comprises a step wherein identifying and descriptive information is added to the audiovisual program content.

8. An audiovisual program content preparation method according to claim 1, characterized in that whenever at least one sequence is selected at the moment t, that sequence is extracted beginning at a predefined moment (t−d1) prior to the moment t, and continuing until a predefined moment (t+d2) after the moment t.

9. An audiovisual program content preparation method according to claim 1, characterized in that the step of extracting sequences comprises detecting cuts in sequences.

10. An audiovisual program content preparation system characterized in that it comprises:

at least one terminal comprising:
  means for selecting a group of users,
  means for selecting sequences from a chosen audiovisual program content feed by identifying them using markers, and
  means for rating the sequences saved in a database that is accessible to the users of said group;
and a server comprising:
  means for extracting sequences using markers for the chosen feed of audiovisual program content, and
  means for saving the extracted sequences in a database that is accessible to the users of said group.

11. A terminal for an audiovisual program content preparation system according to claim 10, characterized in that it comprises:
  means for selecting a group of users,
  means for selecting sequences from a chosen audiovisual program content feed by identifying them with markers that are intended to be sent to a server of the audiovisual program content preparation system, and
  means for rating the sequences saved in a database that is accessible to the users of said group.

12. A server for an audiovisual program content preparation system according to claim 10, characterized in that it comprises:
  means for extracting sequences from the chosen audiovisual program content feed using markers that are sent by a terminal of the audiovisual program content preparation system, and
  means for saving the extracted sequences in a database that is accessible to the users of a group selected from the terminal of the audiovisual program content.

* * * * *